United States Patent
Vincent (10) Patent No.: US 8,938,572 B1
(45) Date of Patent: Jan. 20, 2015

(54) VIRTUAL MACHINE MEMORY PAGE SHARING SYSTEM

(71) Applicant: Amazon Technologies, Inc., Reno, NV (US)

(72) Inventor: Pradeep Vincent, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/953,268

(22) Filed: Jul. 29, 2013

Related U.S. Application Data (63) Continuation of application No. 12/895,462, filed on Sep. 30, 2010, now Pat. No. 8,499,114.

(51) Int. Cl.
  *G06F 12/08* (2006.01)
  *G06F 9/445* (2006.01)
  *G06F 12/10* (2006.01)

(52) U.S. Cl.
  CPC ........ *G06F 9/44563* (2013.01); *G06F 12/1009* (2013.01)
  USPC ............... 711/6; 711/154; 711/203; 711/206; 711/208

(58) Field of Classification Search
  USPC .............................. 711/6, 154, 203, 206, 208
  See application file for complete search history.

(56) References Cited

U.S. PATENT DOCUMENTS

| | | | |
|---|---|---|---|
| 6,141,722 A | 10/2000 | Parsons | |
| 6,282,621 B1 | 8/2001 | Parsons | |
| 6,789,156 B1 | 9/2004 | Waldspurger | |
| 6,963,957 B1 | 11/2005 | Kundu et al. | |
| 7,313,793 B2 | 12/2007 | Traut et al. | |
| 7,500,048 B1 | 3/2009 | Venkitachalam et al. | |
| 7,620,766 B1 | 11/2009 | Waldspurger | |
| 7,925,850 B1 | 4/2011 | Waldspurger et al. | |
| 8,074,047 B2 | 12/2011 | Abali et al. | |
| 8,190,823 B2 | 5/2012 | Waltermann et al. | |
| 8,190,827 B2 | 5/2012 | Eidus et al. | |
| 8,239,609 B2 | 8/2012 | Hudzia et al. | |
| 2004/0098544 A1 | 5/2004 | Gaither et al. | |
| 2008/0005489 A1 | 1/2008 | Watkins et al. | |
| 2008/0127182 A1 | 5/2008 | Newport et al. | |
| 2008/0163210 A1 | 7/2008 | Bowman et al. | |
| 2008/0201414 A1* | 8/2008 | Amir Husain et al. | ....... 709/203 |
| 2009/0287901 A1 | 11/2009 | Abali et al. | |
| 2009/0300023 A1 | 12/2009 | Vaghani | |

(Continued)

OTHER PUBLICATIONS

Bugnion, E., S. Devine, and M. Rosenblum. 1997. Disco: Running commodity operating systems on scalable multiprocessors. In *Proceedings of the 16th ACM Symposium on Operating Systems Principles*, 18 pages, 1997.

(Continued)

*Primary Examiner* — Yong Choe
(74) *Attorney, Agent, or Firm* — Knobbe Martens Olson & Bear LLP (57) ABSTRACT

Various embodiments disclosed herein including systems and methods for improving allocation of computing resources in a virtual machine (VM) environment. Embodiments maintain data relating to how VM image data is stored in storage devices and loaded into volatile memory such as random access memory (RAM). The data is then used to identify common content in the volatile memory that can be shared across VM instances. In some embodiments, multiple VM instances can share at least a portion of a single common VM image loaded into a shared volatile memory.

21 Claims, 8 Drawing Sheets

(56) References Cited

U.S. PATENT DOCUMENTS

| | | |
|---|---|---|
| 2009/0300607 A1 | 12/2009 | Ferris et al. |
| 2010/0161879 A1 | 6/2010 | Nation et al. |
| 2010/0169948 A1 | 7/2010 | Budko et al. |
| 2010/0191783 A1 | 7/2010 | Mason et al. |
| 2010/0223432 A1 | 9/2010 | Eidus et al. |
| 2011/0099318 A1 | 4/2011 | Hudzia et al. |
| 2012/0221800 A1 | 8/2012 | Eidus et al. |
| 2013/0024645 A1 | 1/2013 | Cheriton et al. |

OTHER PUBLICATIONS

Czajkowski, G., L. Daynes, and N. Nystrom. 2002. Code sharing among virtual machines. In B. Magnusson (Ed.), *ECOOP 2002, LNCS 2374*, pp. 155-177. Berlin Heidelberg: Springer-Verlag.

Lagar-Cavilla, H. A., J. A. Whitney, A. Scannell, P. Patchin, S. M. Rumble, E. de Lara, M. Brudno, and M. Satyanarayanan. 2009. SnowFlock: Rapid virtual machine cloning for cloud computing. In *Proceedings of the 4th ACM European Conference on Computer Systems, ACM*, 12 pages.

Miloś, G., D. G. Murray, S. Hand, and M. A. Fetterman. 2009. Satori: Enlightened page sharing. In *Proceedings of the USENIX Annual Technical Conference*, 14 pages.

Rosenblum, M. and T. Garfinkel. 2005. Virtual machine monitors: Current technology and future trends. Computer, 38(5):39-47.

Vrable, M., J. Ma, J. Chen, D. Moore, E. Vandekieft, A. C. Snoeren, G. M. Voelker, and S. Savage. Oct. 23-26, 2005. Scalability, fidelity, and containment in the Potemkin virtual honeyfarm. In Proceedings of the 20th ACM Symposium on Operating Systems Design and Implementation, 14 pages.

Waldspurger, C. A. Dec. 9-11, 2002. Memory Resource Management in VMware ESX Server. In Proceedings of the 5th Symposium on Operating Systems Design and Implementation, pp. 1-14.

\* cited by examiner

VIRTUAL MACHINE MEMORY PAGE SHARING SYSTEM

CROSS REFERENCE TO RELATED APPLICATIONS

The present application is a continuation of U.S. patent application Ser. No. 12/895,462, filed Sep. 30, 2010, the disclosure of which is hereby incorporated by reference in its entirety.

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers can house significant numbers of interconnected computing systems, such as, e.g., private data centers are operated by a single organization and public data centers operated by third parties to provide computing resources to customers. Public and private data centers can provide network access, power, hardware resources (e.g., computing and storage), and secure installation facilities for hardware owned by the data center, an organization, or by other customers.

To facilitate increased utilization of data center resources, virtualization technologies can allow a single physical computing machine to host one or more instances of virtual machines that appear and operate as independent computer machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

While virtualization can make available a large number of running virtual machine instances, the task of managing system resources such as volatile memory (e.g., random access memory (RAM)) allocated to those instances involves a balancing of the goals of performance guarantees (e.g., according to service level agreements (SLAs)) and efficient resource allocation.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Various embodiments including systems and methods for improving allocation of computing resources in a virtual machine (VM) environment are described herein. Embodiments maintain data relating to how VM image data is stored in storage devices and loaded into volatile memory such as random access memory (RAM). The data is then used to identify common content in the volatile memory that can be shared across VM instances. In some embodiments, multiple VM instances can share at least a portion of a single common VM image loaded into a shared volatile memory. In some embodiments, data relating to differences among various versions of a VM image is also maintained, so that sharing can also be accomplished among instances instantiated from different versions of a VM image.

Various aspects of the disclosure will now be described with regard to certain examples and embodiments, which are intended to illustrate but not to limit the disclosure.

Virtual Machine Environment

Figure 1:
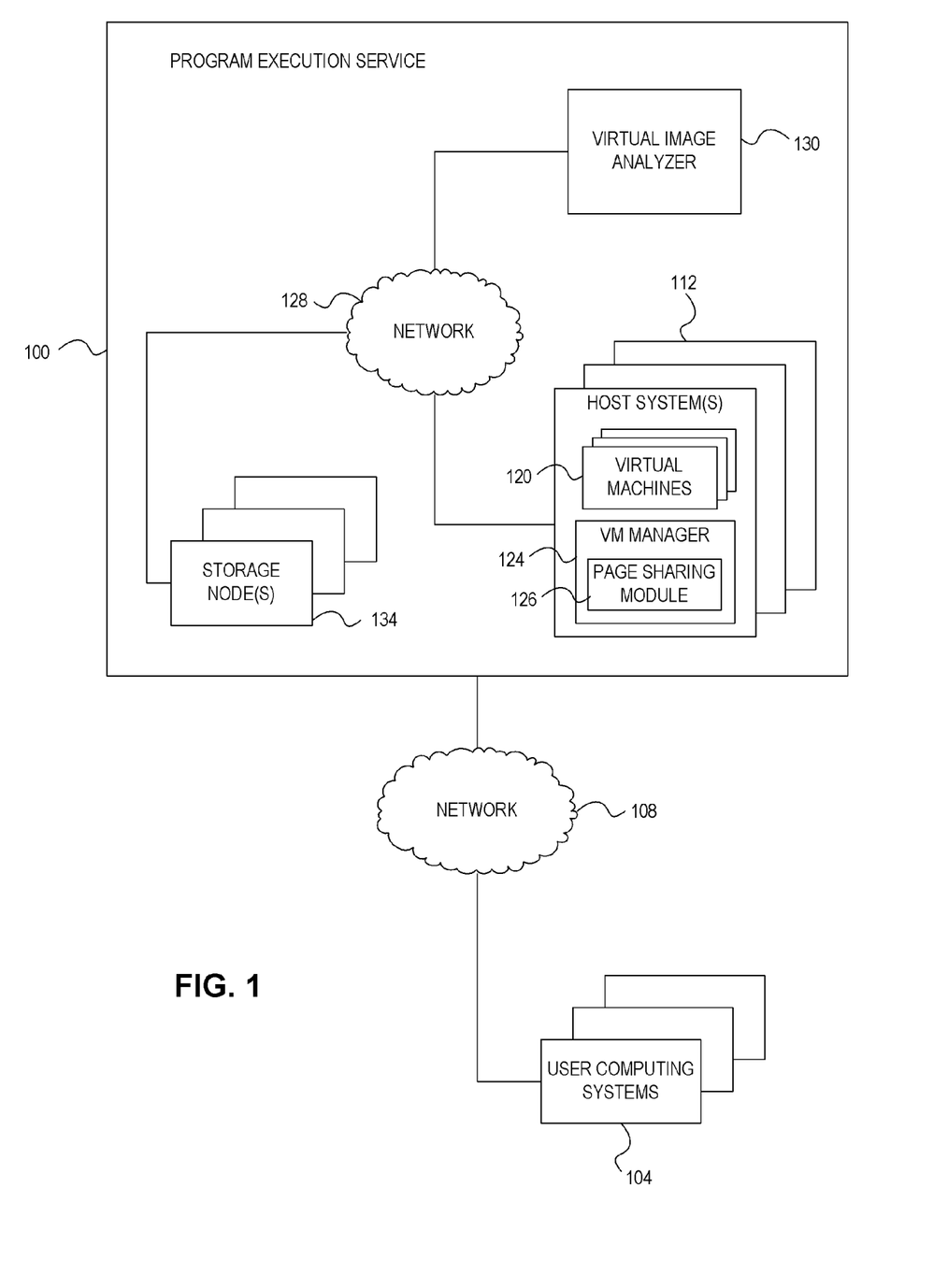
FIG. 1 is a network diagram schematically illustrating an example of a program execution service that can provide computing resources to multiple user computing systems via a communication network.

FIG. 1 is a network diagram schematically illustrating an example program execution service 100 that can provide computing resources to multiple user computing systems 104 via a communication network 108. The program execution service 100 can be a web service or a collection of web services that can provide computing resources for rent to use for web and/or other application hosting. For example, the program execution service 100 can manage requests from a user to execute a program or set of programs, on behalf of the user. At least some of the user computing systems 104 can be remote from the program execution service 100. In this example, users can use the computing systems 104 to access the program execution service 100 over the communication network 108. The network 108 can, for example, be a publicly accessible network of linked networks, possibly operated by various distinct parties, such as the Internet. In other embodiments, the network 108 can be a private network, such as, for example, a corporate or university network that is wholly or partially inaccessible to non-privileged users. In still other embodiments, the network 108 can include one or more private networks with access to and/or from the Internet.

The program execution service 100 provides functionality for managing execution of programs for multiple users. In the example illustrated in FIG. 1, the program execution service 100 includes a plurality of computing nodes that can execute programs on behalf of the users. The computing nodes can include one or more virtual machines (VMs) 120 hosted on one or more physical computing systems 112. For example, a host computing system 112 can host multiple VMs 120 and can include a VM manager 124, such as a hypervisor or other VM monitor, to manage those VMs 120.

In certain embodiments, the VM manager 124 includes a virtualization platform that allows for multiple operating systems to run on a host computer at the same time. For instance, the VM manager 124 can include a thin piece of software that runs directly on top of the hardware platform of the host computer and that virtualizes resources of the machine (e.g., a native or "bare-metal" hypervisor). In such embodiments, the virtual machine(s) 120 can run, with their respective operating systems, on the VM manager 124 without the need for a host operating system. Examples of such bare-metal hypervisors can include, but are not limited to, ESX SERVER by VMware, Inc. (Palo Alto, Calif.), XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), and VIRTUOZZO by Parallels, Inc. (Switzerland).

In yet other embodiments, at least some of the computing nodes 112 can have a hosted architecture in which the VM manager 124 runs within a host operating system environment. In such embodiments, the VM manager 124 can rely on the host operating system for device support and/or physical resource management. Examples of such hosted VM managers 124 or hypervisors can include, but are not limited to, VMWARE WORKSTATION and VMWARE SERVER by VMware, Inc., VIRTUAL SERVER by Microsoft Corporation, PARALLELS WORKSTATION by Parallels, Inc, and Kernel-Based Virtual Machine (KVM) (open source).

In the example illustrated in FIG. 1, each of the computing nodes 112 has some amount of computing resources available for executing one or more programs. Each computing node 112 can provide a specific amount of program execution capacity, which can be measured, for example, by a combination of one or more of processing capacity (e.g., number and/or size of processing units), memory capacity, storage capacity, network bandwidth capacity, non-network communication bandwidth, etc. In some embodiments, the program execution service 100 can provide preconfigured computing nodes 112, with each preconfigured computing node having similar and/or equivalent amounts of resources available for executing programs on behalf of users. In other embodiments, the program execution service 100 can provide a selection of various different computing nodes 112 from which a user can choose for executing programs on behalf of the user. In yet other embodiments, the program execution service 100 can generate various computing nodes that are specific to a user and execution of the user's program. In some such embodiments, the computing nodes 112 can have varying amounts and/or types of computing resources (e.g., size, speed and/or type of processing units; number of processing units; amount of memory and/or storage; platform configuration, such as 32-bit or 64-bit, operating system, etc.).

The program execution service 100 can provide user computing systems 104 with access to storage nodes 134 that provide mass storage of data, programs, and other user information. The storage nodes 134 can include any type of persistent data storage, for example non-volatile memory devices such as, e.g., hard disk drives, optical disk drives, solid-state memory, etc. For example, the storage nodes 134 can include a storage area network (SAN), network attached storage (NAS), or some combination of the same or the like. In the example illustrated in FIG. 1, the computing nodes 112 can access the storage nodes 134 via a network 128. The network 128 can include multiple networking devices (not shown) such as, e.g., switches, edge routers, core routers, etc. The network 128 can, but need not be, a different network than the network 108 shown in FIG. 1.

In the depicted embodiment, the VM manager 124 includes a page sharing module 126. The page sharing module 126 can include hardware and/or software for implementing memory page sharing between the VMs 120. Further, a virtual image analyzer 130 is also included in the program execution service 100 to facilitate sharing of memory pages. The virtual image analyzer 130 can be implemented in a physical machine or a virtual machine and may be implemented on the same host system 112 as the page sharing module 126. Advantageously, in certain embodiments, the page sharing module 126 and the virtual image analyzer 130 reduce consumption of memory on the host systems 112. The functionality of these components is described in greater detail below.

It should be noted that although illustrated as part of the VM manager 124, the page sharing module 126 can be a separate component from the VM manager 124. Further, in some implementations, the functionality of the virtual image analyzer 130 and the page sharing module 126 is combined into a single component.

Disk Device Tagging and Page Sharing

Page sharing is a common technique used in operating systems to reduce volatile memory (e.g., RAM) usage when the same memory contents are used by multiple applications. In the VM environment, the most commonly used technique for page sharing among VM instances is to share memory pages populated with common contents from disk storage/file system that are physically shared by multiple VM instances.

A VM is instantiated from a VM image, which, in various embodiments, contains a number of operating system, configuration data, and/or software application files packaged or bundled together. In various embodiments, VM images are used to create root or boot disk volumes for VMs, though the VM images can also be used for instantiation of non-bootable regular volumes. In practice, many VMs may not share physical disk storages/file systems. For example, sometimes two different VM instances executed on a same host with a shared main volatile memory are instantiated from two copies of the same VM image that are stored in different data storages. Without knowledge of the other VM instance, each VM instance loads parts of its own VM image into the shared main memory. The result is that the memory pages owned by the different instances may have exactly the same content but yet use different memory pages.

Because VMs may not share physical disk storages/file systems, techniques other than those discussed above are desirable to identify common content eligible for page sharing. One such technique involves scanning the memory pages of multiple VMs to detect overlap in content and then enabling sharing of detected common content. However, scanning the memory pages to detect content overlap is inefficient because the scanning process typically requires scanning each individual page in memory and thus consumes a large quantity of processing power and system resources.

To enable page sharing across VMs that do not share physical disk storages and/or file systems, the virtual image analyzer and/or the page sharing module 126 apply data tags to contents in both the physical storage device and/or the memory that are associated with particular VMs. The data tags can then be used to identify contents in memory (e.g., pages in memory) across VM instances that may be shared.

Figure 2:
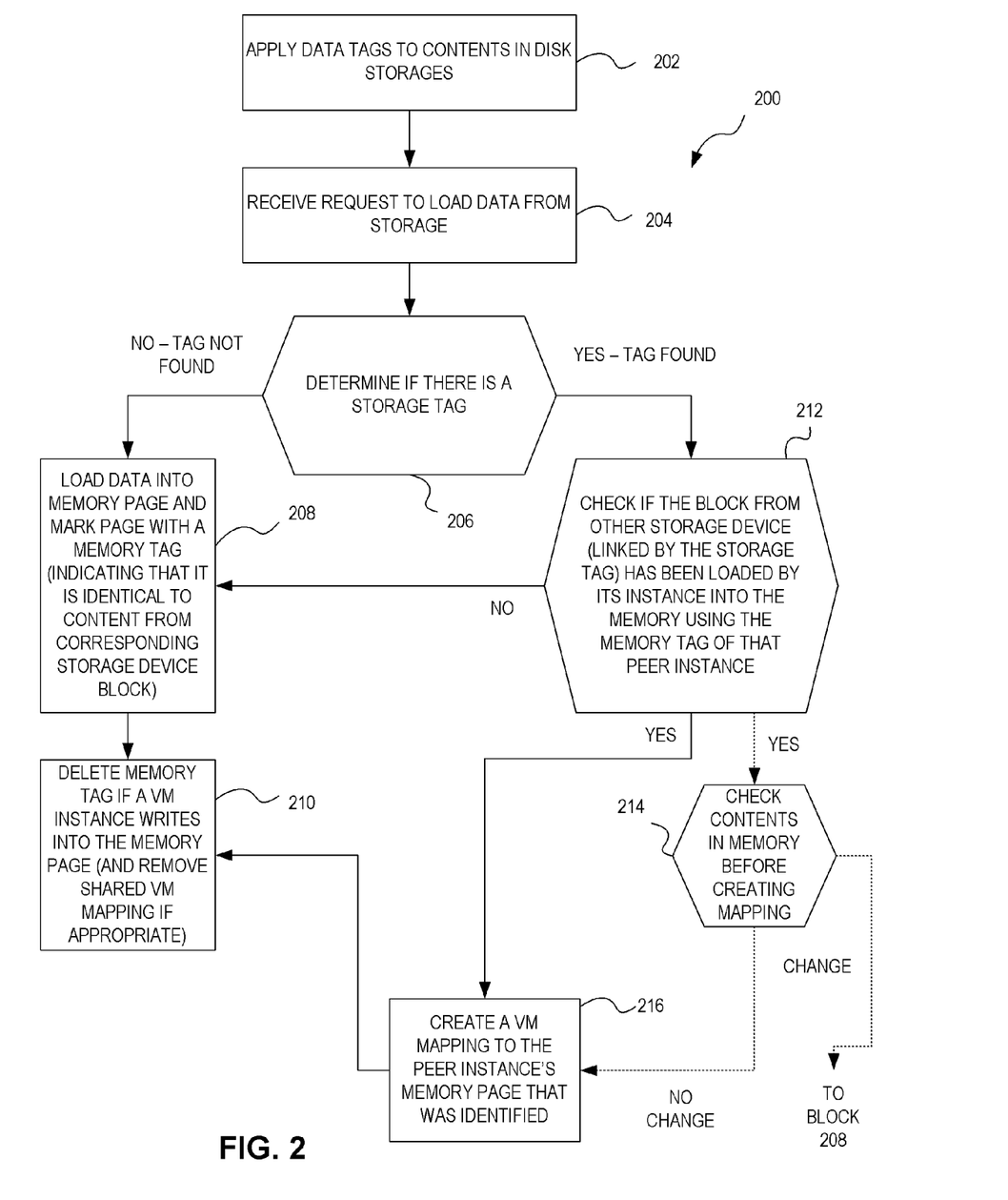
FIG. 2 is a flow diagram that provides an embodiment of a process of applying data tags to virtual machine image data and utilizing the tags in determining when page sharing is appropriate.

FIG. 2 is a flow chart that illustrates an embodiment of a process 200 of applying data tags to VM image data and utilizing the tags in determining when page sharing is appropriate. Some or all of the aspects of the process 200 can be performed by the page sharing module 126, while other aspects may be performed by the virtual image analyzer 130 and/or other processes running remotely with respect to the host systems 112.

At block 202, data tags are applied to contents in disk storage associated with particular VMs. This block can be performed by the virtual image analyzer 130. In one embodiment, for storage devices that are instantiated from the same VM images, the process creates "storage tags" that indicate links between blocks of storage devices and signify that they were instantiated from the same block from a VM image. For example, if a VM image "A" is used to instantiate VM "A1" and VM "A2," storage tags may be applied to the local or remote storage device associated with the VM "A1" and the local or remote storage device associated with the VM "A2" to indicate that they were both instantiated from the identical (or substantially similar) VM image "A." However, if a VM instance writes to a block that has been tagged, the "storage tag" is deleted. In one embodiment, if data contents referenced by storage tags are changed, the storage tags are removed. By using storage tags to mark common data, logical links of such data are created. The process of creating linkages among blocks of data in storage will be further illustrated in FIGS. 3-5.

The remaining blocks of the process 200 can be performed by the page sharing module 126. At block 204, a request to load data (e.g., a block of data) from the storage device (e.g., a disk) into main memory is received from a VM instance. At block 206, the data tags are consulted to determine if another VM instance has the corresponding data (e.g., a block of data) in its associated storage device. If no such storage tag is found, the content is loaded into the main memory (e.g., into a memory page) at block 208 and marked with a "memory tag" that indicates that it is an identical copy of the content in the corresponding block in the storage device. However, as shown at block 210, if at a later time a VM instance writes to (i.e., modifies the contents of) the memory page, the "memory tag" is deleted. This is because the content in the memory page no longer corresponds to that which is stored in the storage device. If the page is shared, in one embodiment, the shared VM mapping is also removed at block 210.

If a storage tag is found at block 206 (meaning that common data exists in the image stored for a peer VM instance), the process 200 proceeds to block 212 to check if the corresponding block from the other storage device (linked by the storage tag) has been loaded by its associated VM instance into the memory. This check can be accomplished by using the memory tag of the peer VM instance's storage device block, which may have been created earlier in accordance with the procedure set forth in block 208. Returning to the example above, if VM "A1" is currently loading a block of data from its storage device into memory and a storage tag is found for the block, the process 200 would check to see if the corresponding block in VM "A2's" local storage device has been loaded into the main memory.

Returning to FIG. 2, if a memory tag is found at block 212, then at block 216, instead of loading data into the main memory from the storage device as requested at block 206, the process 200 creates a VM mapping to the peer VM instance's memory page that was identified at block 212. Thus, in the example, if VM "A2's" corresponding block has been loaded into a memory page, the process 200 would create a VM mapping to that page in response to VM "A1's" request to load the same content into memory. Otherwise, if the peer instance has not loaded the corresponding block (e.g., no memory tag is found), the process 200 moves to block 208 and performs the data loading procedure as described above.

In one embodiment, the storage tags are implemented as soft tags, and an additional check is performed at block 214 to ensure that the data contents previously loaded into the memory have not been changed and are the same as those in storage. The soft tag configuration may be useful in implementations in which copy on write mechanisms (which ensure identity of data between that which is loaded in memory and that which is in storage) cannot be implemented or are otherwise not implemented due to performance reasons or system resource limitations. In one embodiment, the check performed in block 214 includes a hash comparison of data contents between those in memory and those in storage. If a change is detected, the process moves to block 208 where data from storage is loaded into a new memory page. If no change is detected, the process moves to block 216 where a VM page mapping is created as described above.

Figure 3:
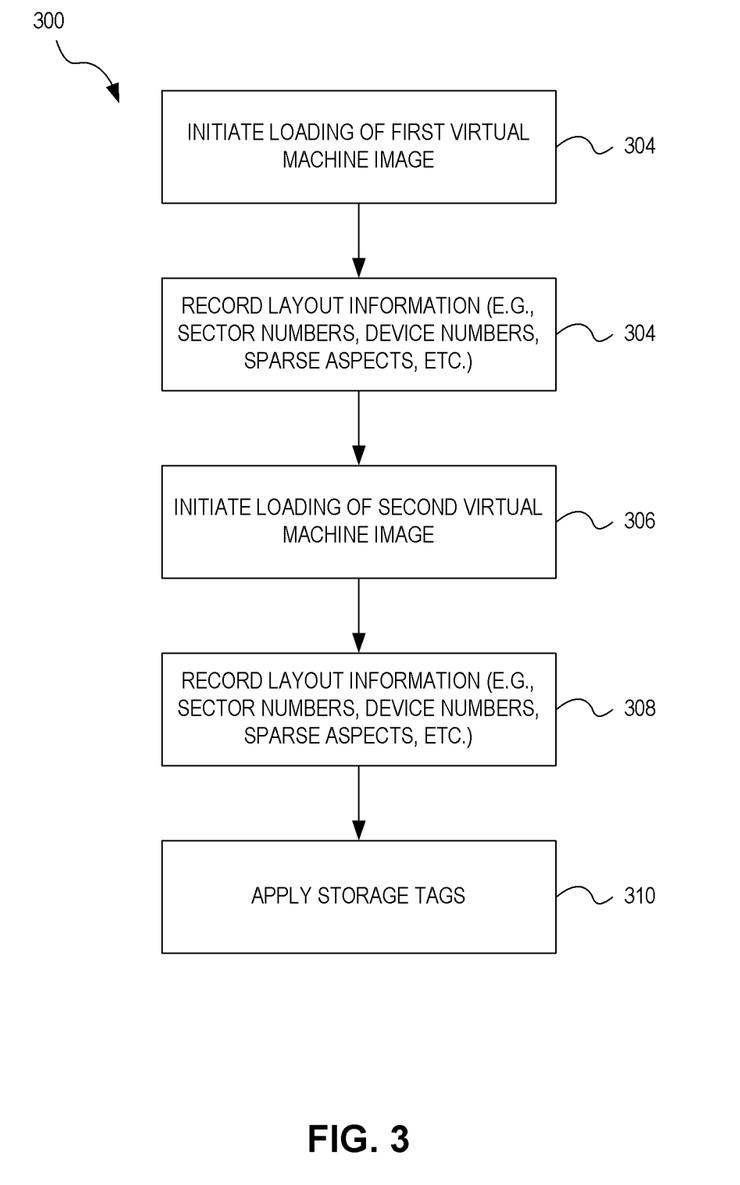
FIG. 3 is a flow diagram illustrating a process of applying storage tags in accordance with one embodiment.

FIG. 3 is a flow diagram showing an embodiment of a process 300 of applying storage tags. The process 300 can also be implemented by the virtual image analyzer 130 and/or the page sharing module 126 of FIG. 1.

At block 302, the process of loading a first VM image into a local or remote storage device or a device within networked storage (e.g., SAN or NAS) is initiated as part of instantiation. In one embodiment, the loading process allows the VM image to be made available for use to a user of one of the computer systems 104 shown in FIG. 1. At block 304, as part of the loading process, information regarding how the VM image data is laid out in the storage device or a device within the networked storage is recorded. The information may include the physical sector numbers and/or device numbers indicating the location(s) of the VM image data within the storage device. In some embodiments, other type of location/layout information may be included if the VM image is stored into other types of devices (such as non-volatile memory or RAID) that may use different terminology to refer to physical locations of memory.

In one embodiment, the layout information also includes sparse aspect information. This information may indicate whether the VM image is of a sparse type in which gaps exist within the contiguous units of memory occupied by the VM image or a non-spare type in which gaps within the contagious units of memory are filled in with zeros or the like. As shown at blocks 306 and 308 in FIG. 3, the same procedure is repeated for another VM instance. This second VM instance can have the same or substantially the same virtual image as the image associated with the first VM instance but with different a storage volume. In one embodiment, the virtual image analyzer 130 maintains this layout data for each VM instantiated.

In various embodiments, since there may be multiple types of VM images for different purposes, the virtual image analyzer 130 also maintains information on the type of VM images that are loaded into storage. In one embodiment, each VM image has a type ID that indicates its type. The virtual image analyzer 130 uses this type ID at block 310 to determine, for example, if the second VM image loaded is of the same type as the first VM, and if so, applies the appropriate storage tags in accordance with the layout information recorded for each VM. In another embodiment, the virtual image analyzer 130 provides a user interface to the user, who, through one of the computer systems 104, can indicate the type of VM image that is currently being instantiated. The virtual image analyzer 130 can use the user-provided type information to determine whether a common VM image has been loaded.

Although FIG. 3 depicts the illustrative process of loading two example VM images, it is to be understood that the virtual image analyzer 130 in various embodiments handle the analysis of many VM images of different types. In addition, the process of applying storage tags may occur after the loading of each VM image as shown, or periodically as part of a scheduled routine. Further, in certain implementations, the virtual image analyzer 130 can analyze images and apply storage tags to images without loading the images, for example, by directly analyzing the storage devices associated with those images.

Data and Storage Tag Illustrations

Figure 4:
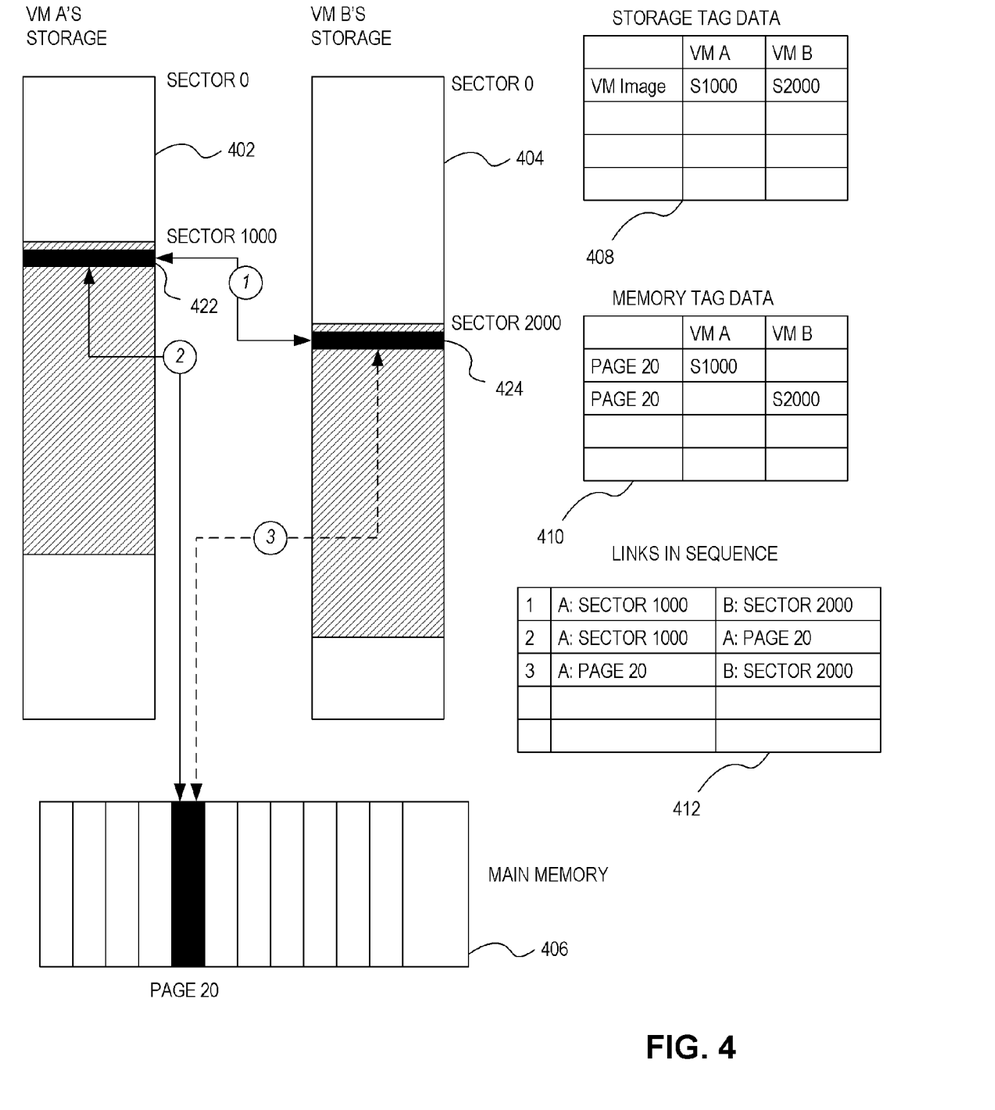
FIG. 4 is a block diagram illustrating application of storage and memory tags in accordance with one embodiment.

FIG. 4 is a block diagram illustrating the application of storage and memory tags in accordance with one embodiment. The local or remote storages of two example VMs, VM "A" (404) and VM "B" (406), are shown. Both "A" and "B" are instantiated from the same or substantially same VM image. As described above with respect to FIG. 3, the virtual image analyzer 130 can record the layout information of the VM image as part of the VM image loading process. Here, in VM "A's" local storage, the image of VM "A" (shaded in grey stripes) starts in physical sector 1000, and the image of VM "B" starts in physical sector 2000 of VM "B's" local storage. This information is used to create storage tags, which may be stored in a data structure 408. As shown, the data structure 408 stores the sector numbers indicating the start locations of the VM images for VM "A" and "B." This creates a logical link between the two pieces of identical data, which is reflected by the double-arrow connection "1" and the first entry in a logical links table 412, which illustrates the logical linkages shown in the figure.

In various embodiments, the data structure 408 may be an array, a linked list, a hash table, a tree-based data structure, and/or a combination of these data structures. In one embodiment, the virtual image analyzer 130 makes a determination on the type of data structure to be used based on the type of VM image. For example, if the VM image is a non-sparse VM image, then an array or linked list may be used to maintain the storage tags. If the VM image is a sparse VM image, then a tree-based data structure may be used. Although the data storages are shown to be addressable by sector, the actual addressable memory units and layouts of the storages may be different depending on the configuration of the host system 112 (see FIG. 1). In addition, the addressable memory units may be logical addresses that are subject to additional translation. In some embodiments, the data structure 408 does not store the actual memory addresses, but instead stores offset values relative to a pre-determined address (e.g., a sector 0). In other embodiments, the data structure 408 includes additional information such as storage device numbers if the VM image data is stored in networked storage.

In one embodiment, a similar data structure 410 is used to store memory tags associated with the individual VMs. The page sharing module 126 can create this data structure 410. In one embodiment, the data structures 408 and 410 are implemented as one structure. The data structure 410 shows that a page 20 in main memory 406 contains VM image content 422 of VM "A" within sector 1000. In this example, the content 422 was previously loaded into the main memory 406. The first entry in data structure 410 creates another logical link between the two pieces of identical data, which is reflected by the double-arrow connection "2" and the second entry in the links table 412. The logical link as shown by the dotted double arrow connection "3" reflects the VM page mapping referenced by block 214 in FIG. 2. This logical link is created as a result of the page sharing module 126 determining that logical links 1 and 2 exist (based on the data in data structure 408 and 410) and creating this logical mapping to achieve page sharing instead of loading content 424 (which is the same as content 422) into a different location in the memory 406.

Although the figures in this disclosure depict VM images, the various embodiments are applicable to enable page sharing of different types of data that may be used by VMs. For example, embodiments are applicable to virtual kernel images, application data, configuration data, combinations of the same, and the like. In some embodiments, these various types of data may be packaged together within a VM image, in which case the data tagging and page sharing are handled as described above. In one embodiment, the virtual kernel images of some VMs are directly loaded into memory without storage into a physical device. In that embodiment, the data structure 408 and/or 410 are modified to indicate linking directly upon a request to initiate loading of a virtual kernel image. In one embodiment, page sharing may also be initiated if a common virtual kernel image has already been loaded into the memory. For example, the data structure 408 and/or 410 may include a memory address of the uploaded virtual kernel image and data indicating the type of the image. Subsequently, any VM requiring a kernel image of the type that is already indicated in the data structure 408 and/or 410 may be provided a mapping to the kernel image that is already in memory.

Modifying a Shared Page

In one embodiment, as discussed above with reference to block 210 of FIG. 2, once a shared page is subsequently modified, the memory tag is removed because the memory content has changed and is no longer eligible for sharing among multiple VMs. In one embodiment, shared pages are marked as read-only. However, upon receipt of a write command to modify a shared page, in one embodiment, the page sharing module 126 executes a copy-on-write mechanism to create an additional copy of the shared page to accommodate the write command.

Figure 5:
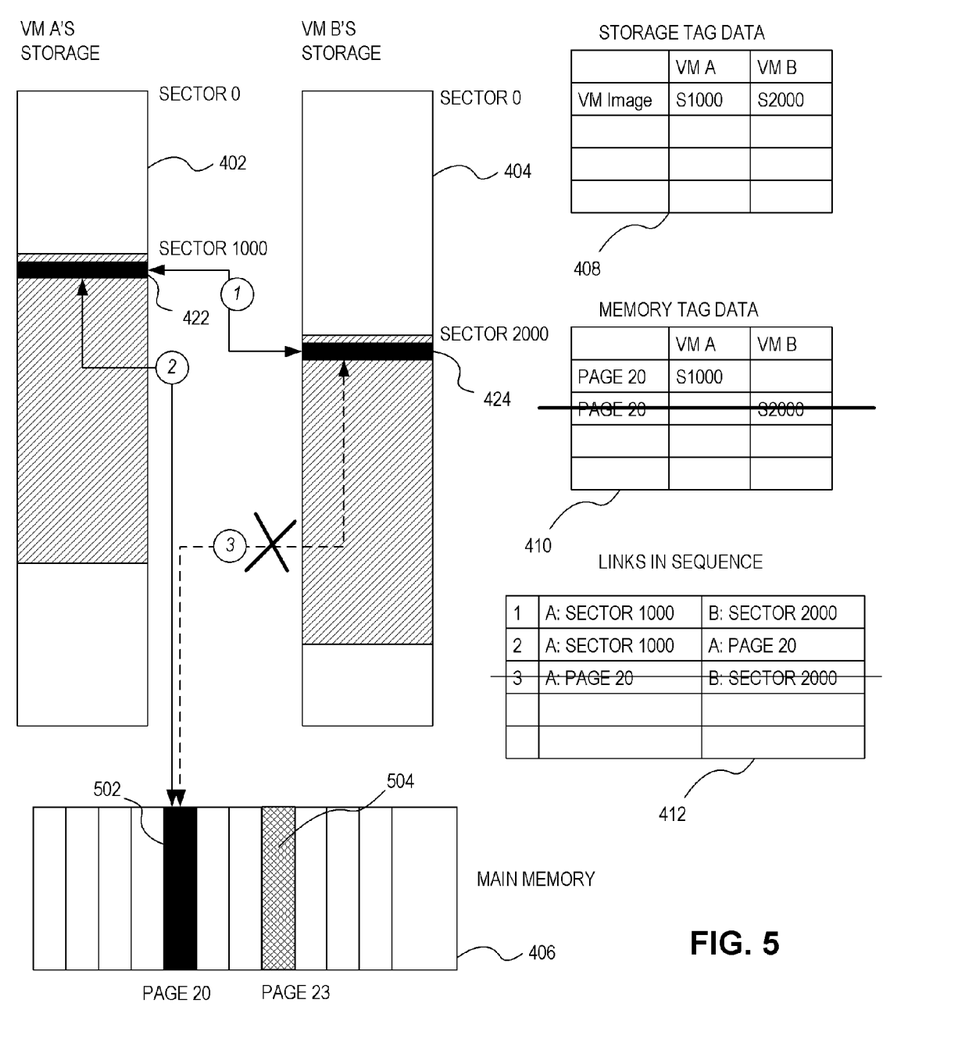
FIG. 5 is a block diagram illustrating modified memory contents as a result of handling a write command to a shared page in accordance with one embodiment.

FIG. 5 illustrates the state of the main memory 406 after the copy on write mechanism is executed in response to a write command issued by VM "B" to update the shared page. Memory content 502, which resides in Page 20, was previously the shared page content. After the execution of the copy on write mechanism as a result of VM "B's" command, the modified memory content 504 is saved in a new memory page, Page 23. In one embodiment, the data structure(s) with the corresponding storage and memory tags are updated to reflect the changes, which are shown by the line crossing out entries in the data structure 410.

As shown, the logical link "3" has been severed as a result, since each VM is now accessing its own page (Page 20 for VM "A" and Page 23 for VM "B"). In one embodiment, a new logical link between the newly created page and the portion of the VM image in the storage associated with the VM requesting the modification may be created. In the example shown in FIG. 5, a new memory tag may be created for the content 504 in Page 23 and a location within VM "B's" image data in the storage 404.

Updates to Virtual Machine Images

Distribution vendors, such as operating system distributors, often release periodic updates to VM images that contain newer versions of specific files and packages. Although updates to VM images may include newer files or packages (or even deletions of files or packages), most of the files or packages are not updated from one release to another. Thus, substantial overlap can occur between VM image versions. However, when updated files and packages are converted into VM images, the block device level alignment of the previous, unmodified VM image version is usually not preserved in the updated VM image. For instance, the addition of a few files to an image can result in a large portion of the blocks in the image being offset. When this occurs, the page sharing features described above may not be usable between old and new images.

Figure 6:
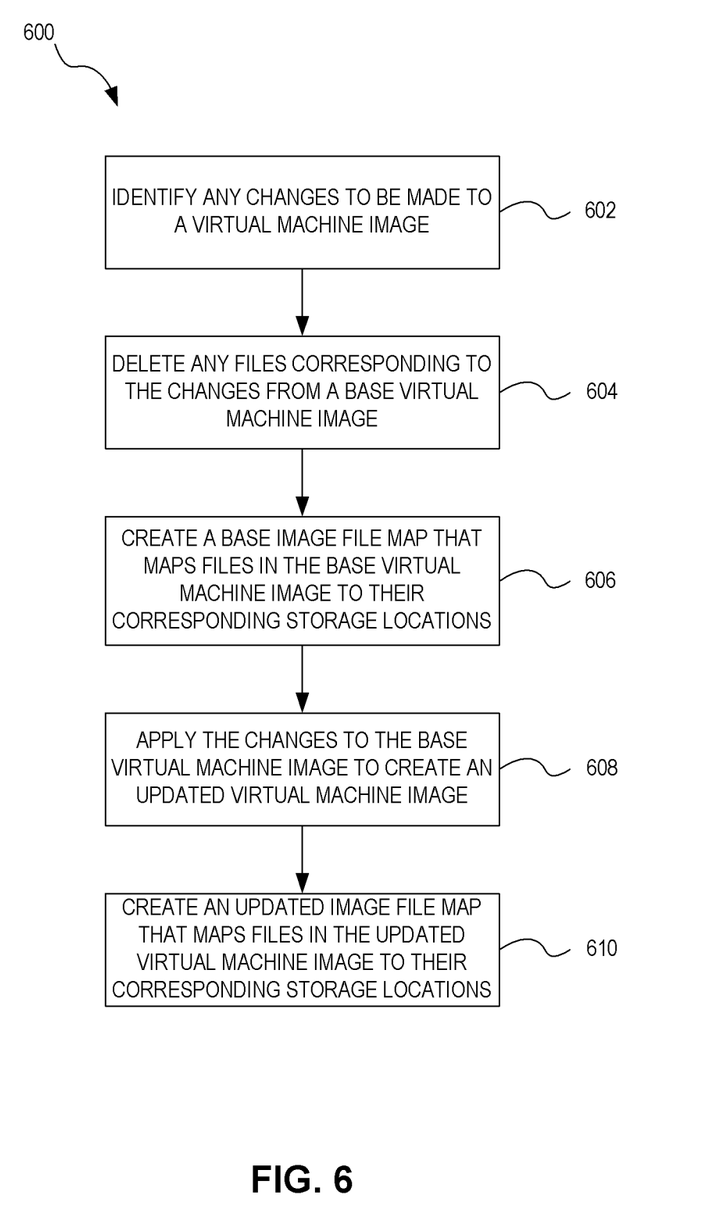
FIG. 6 is a flow diagram illustrating an embodiment of a process for creating file maps for a virtual machine image and an updated version of that virtual machine image.
Figure 7:
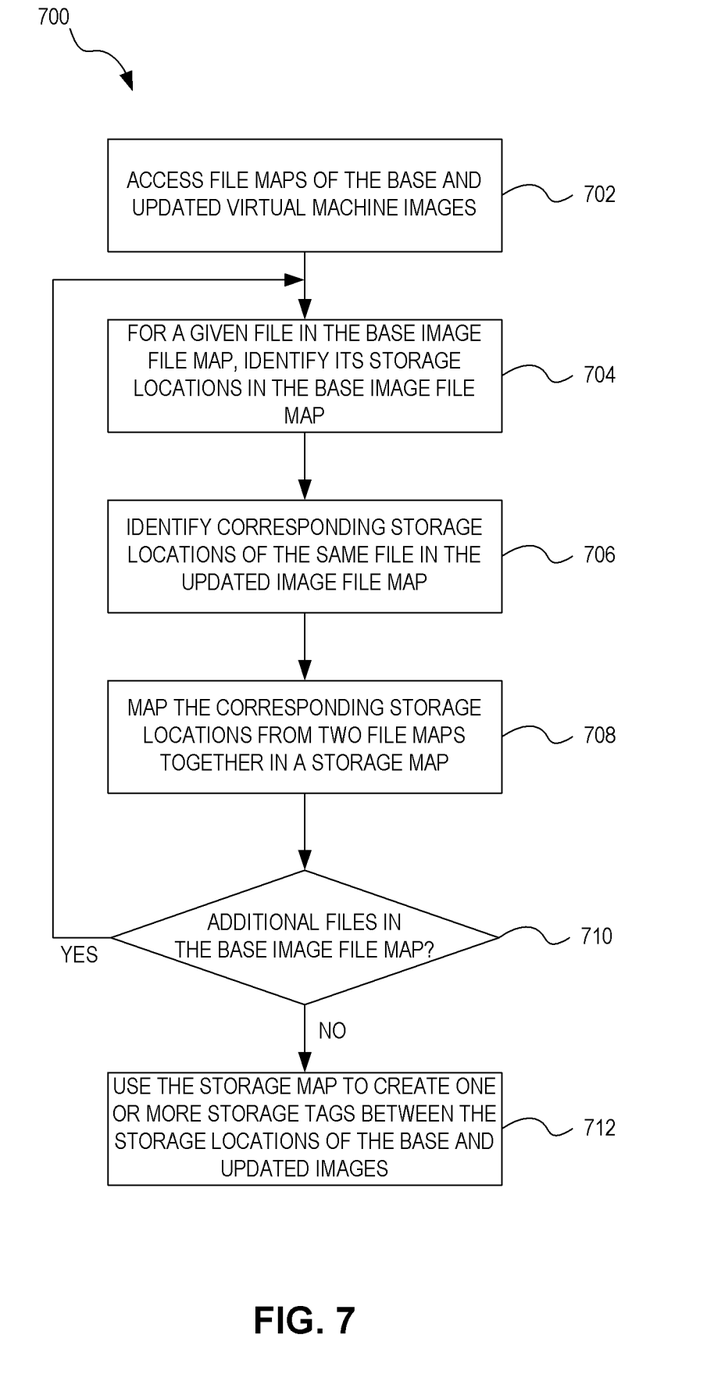
FIG. 7 is a flow diagram illustrating an embodiment of a process for relating storage locations between the base virtual machine image and the updated virtual machine image of FIG. 6.
Figure 8:
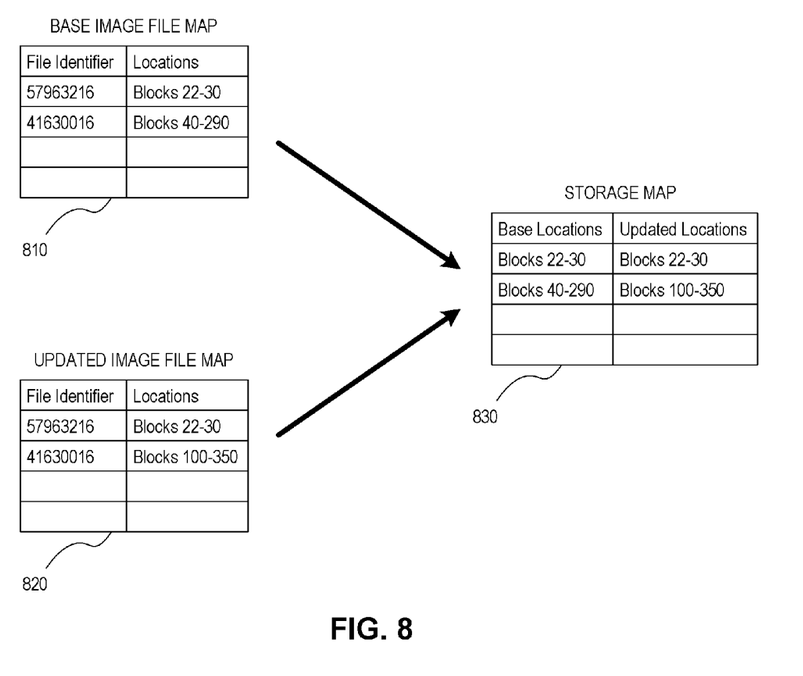
FIG. 8 is a block diagram illustrating examples of storage maps that can be created using the processes of FIGS. 6 and 7.

However, in certain embodiments, the features of the program execution service 100 of FIG. 1 can be extended to enable page sharing to occur between instances of older VM images and updated VM images. FIGS. 6 through 8 below illustrate embodiments of page sharing between images of different content, including base and updated VM images.

FIG. 6 illustrates an embodiment of a process 600 for creating file maps for a VM image and an updated version of that VM image. The process 600 can be implemented by the program execution service 100 of FIG. 1. For example, the process 600 can be implemented by the virtual image analyzer 130. Advantageously, in certain embodiments, the process 600 facilitates maintaining at least some page sharing between an old image and an updated image.

At block 602, any changes to be made to a VM image are identified. These changes can include new files or packages, as described above. The new files or packages can be operating system files, application files, or some combination of the same. The changes can include updates, such as patches or the like. The changes can further include deletions of one or more files or packages or portions of files or packages. Further, the changes can include changes to metadata associated with the VM image in some cases. For example, the changes might include updates to file system structure.

Any files corresponding to the changes are deleted from the base VM image at block 604. By deleting the files, the base VM image is prepared to receive the updated files. Further, in certain embodiments, deleting the files can reduce a number of files to process when identifying identical data portions between files (see block 610, described below). This block 604 can be performed after mounting the base VM image in some embodiments so that the file system of the base VM image is accessible to the virtual image analyzer 130.

A first file map is created at block 606. This file map can map the files in the base VM image to their corresponding storage locations. In one embodiment, the files are represented in the file map with file system metadata, which can include file identifiers used by the operating system associated with the VM image. Examples of file identifiers include inode numbers (Linux), vnode numbers (some types of Unix), and entries in a master file table or MFT (Windows). For convenience, the remainder of this specification will illustrate examples using inode file identifiers, although it should be understood that other identifiers (e.g., for other operating systems) may be used interchangeably.

The storage locations mapped to the file identifiers can include, for example, addresses of content pointed in the files. Examples of storage locations that can be mapped to files include block locations, sector locations, cluster locations, chunk locations (e.g., chunks of blocks), and the like. Any suitable data structure can be used to create the storage map. For instance, the file map can be represented as a table, an array, a matrix, a bitmap, or the like. The file map can be stored external to or internal to the base VM image, such as in metadata associated with the base VM image.

At block 608, the changes described above with respect to block 602 are applied to the base VM image to create the updated VM image. In one embodiment, applying the changes includes adding modified files or packages to the mount of the base VM image. The process of updating the base VM image can be completed in one embodiment by unmounting the base VM image.

At block 610, an updated image file map is created, which maps files in the updated VM image to their corresponding storage locations. This updated image file map can have the same or similar characteristics as the base image file map, except that it is created for the updated VM image. Because the update to the base VM image can change the locations of files that are unchanged from the base to updated image, the storage locations mapped to these files can be different in the updated image file map. This block 610 can also include adding the updated image file map to metadata associated with the updated VM image.

In certain embodiments, the file maps generated by the process 600 are intermediate file maps that can later be combined, compared, or otherwise related together. For example, as will be described in detail below with respect to FIG. 7, the updated storage locations in the updated image file map can be related to corresponding storage locations in the base image file map. These relationships can be used to facilitate page sharing between the base and updated VM images.

Additional characteristics of the process 600 can include ensuring that the file system used for the updated VM image creation has a block size that is a multiple of a block level sector size. Further, if the file system supports dense packing of files, dense packing is disabled in certain embodiments. An example of such a file system is ReiserFS. Many other configurations of the process 600 can be made in various implementations.

Referring to FIG. 7, an embodiment of a process 700 is shown for relating storage locations between the virtual machine image and the updated virtual machine image. The process 700 can take the file maps created by the process 600 as inputs. Like the process 600, the process 700 can also be implemented by the program execution service 100 of FIG. 1. For example, the process 700 can be implemented by the virtual image analyzer 130. The process 700 illustrates one example technique for relating storage locations in the base and updated image file maps to facilitate page sharing.

At block 710, file maps for a base VM image and an updated VM image are accessed. These file maps were described above with respect to FIG. 6. For example, the virtual image analyzer 130 can access the file maps from metadata associated with each VM image. At block 704, for a given file in the base image file map, its storage locations in the base image file map are identified. At block 706, corresponding storage locations of the same file in the updated image file map are identified. In Linux-based operating systems, for instance, files can be identified with unique inode numbers regardless of whether the files are moved. Thus, the inode numbers in the base image file map can be identified in the updated image file map to ascertain the updated image file locations, which may have changed after the update. Other file identifiers can be used in other operating systems to similar effect.

The corresponding storage locations from the two file maps are mapped or related together in a storage map at block 708. The storage map can include any suitable data structure, such as any of the data structures described above with respect to the file maps. In one embodiment, the storage map relates addresses of blocks from the base VM image to addresses of blocks in the updated VM image that have the same content. Alternatively, the storage map can relate locations or addresses of sectors, chunks, clusters, or the like. More generally, the storage map can map similar data between the base and VM images at the sub-file (e.g., block) level, the file level, or at some other level of granularity. The file identifiers can be retained or discarded when creating the storage map. This block 708 can also include adding the storage map to metadata of the updated VM image.

At decision block 710, it is determined whether additional files are referred to in the base image file map. If so, the process 700 loops back to block 704. Otherwise, the process 700 proceeds to block 712, where the storage map is used to create storage tags between storage locations of the base and updated VM images. The page sharing module 126 can then use the page sharing techniques described above with respect to FIGS. 2 through 5 to share memory pages of the base and updated VM images. Thus, if the base and updated VM images are executing in the same host server, page sharing can be performed to reduce memory consumption, even though the base and updated images are not identical.

Features of the processes 600 and 700 will be illustrated using the example file and storage maps shown in FIG. 8. In FIG. 8, two file maps 810, 820 are shown. These file maps 810, 820 include a base image file map 810 and an updated image file map 820. The base image file map 810 includes file identifiers, which in the depicted embodiment include example inode numbers. The file identifiers are associated with block numbers that can represent the blocks associated with the files. For ease of illustration, two files are shown represented in the base image file map 810, although a file map may include many files in an actual implementation. The base image file map 810 could have been generated in this example by the process 600.

The updated image file map 820 includes similar contents to that of the base image file map 810, organized in a similar manner. However, while the first file listed (file number 57963216) in the map 820 has the same block locations as the same file in the base image file map 810, the second file listed (file number 41630016) has different block locations in the updated image file map 820. These different block locations reflect changes made to the updated VM image.

An example storage map 830 that relates the two file maps 810, 820 is also shown. The storage map 830 could have been generated by the process 700 in this example. The storage map 830 relates the block locations for the respective files. Thus, for example, blocks 22-30 in the base image are associated with blocks 22-30 in the updated image because the storage locations for the first file (57963216) did not change. Blocks 40-290 from the base image are associated with blocks 100-350 from the updated image because the storage locations for the second file (41630016) changed in the update.

In the depicted embodiment, the storage map 830 relates the block locations of the files instead of file numbers of the files. Relating the block locations together can enable the page sharing module 126 to create storage tags between related blocks (or other data portions). Although the file identifiers have been dropped when creating the storage map 830, they can be included in a storage map in other embodiments.

Various alternative features to those described with respect to FIGS. 6 through 8 may be used in different implementations. For example, in one embodiment, instead of creating two file maps and then a storage map, the virtual image analyzer 130 can directly create the storage map from the images without creating the file maps. The virtual image analyzer 130 can perform this functionality by mounting both the base VM image and the updated VM image (e.g., at the same or substantially the same time). The virtual image analyzer 130 can then access file numbers in the two images, determine whether any changes to those files have occurred, and then map the storage locations of files that are unchanged from the base to the updated image.

In another embodiment, the page sharing module 126 can generate storage tags directly from the file maps. Thus, the virtual image analyzer 130 can forego creation of a storage map in certain embodiments. Further, in some embodiments, the base image file map can be created before deleting the files to be updated. Then, when creating the storage map, the files in the base image file map can be compared with the files in the updated image file map (e.g., by hashing) to determine whether they are still the same. Files that are the same can then be mapped together (or their storage locations can be mapped together) in the storage map.

Moreover, in certain embodiments, the page sharing module 126 can also share pages among more than two virtual machines. For instance, the page sharing module 126 can share pages among two or more generations of images (such as oldest, newer, and newest updated images) by traversing the storage maps for each image. As an example, a first image can be mapped to a second, updated image with a first storage map using the techniques described above. The second image can then be mapped to a third, newer image with a second storage map using the techniques described above. Then, the page sharing module 126 can examine the first and second storage maps to determine the block storage locations in the first image that correspond to block storage locations in the second and/or third images. In this manner, pages from the first and second, first and third, or first, second, and third images can be shared together in memory. These features can also be extended to any number of related images. Many other configurations are possible.

Conclusion

Thus, in various embodiments, the systems and processes described herein can transform information about storage locations of portions of virtual machine images into data representing physical similarities between virtual disks that can be used to reduce physical memory consumption.

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for improving allocation of computing resources in a virtual computing environment, the system comprising a virtual machine host, and further comprising:
   a memory accessible by the virtual machine host;
   one or more data storage devices configured to store first virtual machine data contents at a first storage location and store second virtual machine data contents at a second storage location, wherein the second virtual machine data contents are interchangeable with the first virtual machine data contents, and wherein the first and second virtual machine data contents are associated respectively with first and second virtual machine instances running on the virtual machine host;
   one or more processors configured to:
      determine a storage tag linking the first storage location with the second storage location;
      receive a request to load a first data portion into the memory, wherein the first data portion is located at a first position within the first virtual machine data contents;
      determine that the storage tag exists, wherein the storage tag indicates that the first position within the first virtual machine data contents corresponds to a second position within the second virtual machine data contents;
      determine whether a second data portion, located at the second position and interchangeable with the first data portion, has been previously loaded into the memory and is still present in the memory; and
      in response to determining that the second data portion has been loaded into the memory and is still present in the memory, providing a virtual mapping reference to the second data portion in the memory, so that the first data portion referenced in the request does not need to be loaded into the memory.

2. The system of claim 1, wherein determining whether the second data portion is still present in the memory comprises accessing memory tags associating data in the memory with data in the one or more data storage devices.

3. The system of claim 2, wherein the one or more processors are further configured to:
   update a memory tag associated with the second data portion in the memory, in order to indicate that the second data portion in the memory corresponds to both the second data portion and the first data portion at their respective positions in the one or more data storage devices.

4. The system of claim 2, wherein the one or more processors are further configured to:
   receive a request to write to the first data portion in the memory, referenced by the virtual mapping reference;
   create, in the memory, a copy of the first data portion;
   update the virtual mapping reference to refer to the copy of the first data portion; and
   write to the copy of the first data portion, in accordance with the request to write.

5. The system of claim 1, wherein determining the storage tag comprises:
   associating the first storage location with the second storage location in a data structure indexed by storage locations, in response to determining that the first virtual machine data contents are interchangeable with the second virtual machine data contents.

6. The method of claim 5, wherein determining that the first virtual machine data contents are interchangeable with the second virtual machine data contents comprises comparing a hash of the first virtual machine data contents with a hash of the second virtual machine data contents to determine that they are very likely to be identical.

7. The system of claim 1, wherein the first storage location and the second storage location are indicated by physical sector addresses.

8. A method of improving allocation of computing resources in a virtual computing environment, the method comprising:
   storing first virtual machine data contents at a first storage location;
      storing second virtual machine data contents at a second storage location, wherein the second virtual machine data contents are interchangeable with the first virtual machine data contents;
      determining a storage tag linking the first storage location with the second storage location;

receiving a request to load a first data portion into a memory, wherein the first data portion is located at a first position within the first virtual machine data contents;

determining that the storage tag exists, wherein the storage tag indicates that the first position within the first virtual machine data contents corresponds to a second position within the second virtual machine data contents;

determining whether a second data portion, located at the second position and interchangeable with the first data portion, has been previously loaded into the memory and is still present in the memory; and in response to determining that the second data portion has been loaded into the memory and is still present in the memory, providing a virtual mapping reference to the second data portion in the memory, so that the first data portion referenced in the request does not need to be loaded into the memory.

9. The method of claim 8, wherein determining whether the second data portion is still present in the memory comprises accessing memory tags associating data in the memory with data in one or more storage volumes.

10. The method of claim 9, further comprising:
updating a memory tag associated with the second data portion in the memory, in order to indicate that the second data portion in the memory corresponds to both the second data portion and the first data portion at their respective positions in the storage volumes.

11. The method of claim 9, further comprising:
receiving a request to write to the first data portion in the memory, referenced by the virtual mapping reference;
creating, in the memory, a copy of the first data portion;
updating the virtual mapping reference to refer to the copy of the first data portion; and
writing to the copy of the first data portion, in accordance with the request to write.

12. The method of claim 8, wherein determining the storage tag comprises:
associating the first storage location with the second storage location in a data structure indexed by storage locations, in response to determining that the first virtual machine data contents are interchangeable with the second virtual machine data contents.

13. The method of claim 12, wherein determining that the first virtual machine data contents are interchangeable with the second virtual machine data contents comprises comparing a hash of the first virtual machine data contents with a hash of the second virtual machine data contents to determine that they are very likely to be identical.

14. The method of claim 8, wherein the first storage location and the second storage location are indicated by physical sector addresses.

15. Non-transitory computer storage comprising computer-executable instructions to:
store first virtual machine data contents at a first storage location;
store second virtual machine data contents at a second storage location, wherein the second virtual machine data contents are interchangeable with the first virtual machine data contents;
determine a storage tag linking the first storage location with the second storage location;
receive a request to load a first data portion into a memory, wherein the first data portion is located at a first position within the first virtual machine data contents;
determine that the storage tag exists, wherein the storage tag indicates that the first position within the first virtual machine data contents corresponds to a second position within the second virtual machine data contents;
determine whether a second data portion, located at the second position and interchangeable with the first data portion, has been previously loaded into the memory and is still present in the memory; and
in response to determining that the second data portion has been loaded into the memory and is still present in the memory, provide a virtual mapping reference to the second data portion in the memory, so that the first data portion referenced in the request does not need to be loaded into the memory.

16. The non-transitory computer storage of claim 15, wherein determining whether the second data portion is still present in the memory comprises accessing memory tags associating data in the memory with data in one or more storage volumes.

17. The non-transitory computer storage of claim 16, further comprising computer executable instructions to update a memory tag associated with the second data portion in the memory, in order to indicate that the second data portion in the memory corresponds to both the second data portion and the first data portion at their respective positions in the storage volumes.

18. The non-transitory computer storage of claim 16, further comprising instructions to:
receive a request to write to the first data portion in the memory, referenced by the virtual mapping reference;
create, in the memory, a copy of the first data portion;
update the virtual mapping reference to refer to the copy of the first data portion; and
write to the copy of the first data portion, in accordance with the request to write.

19. The non-transitory computer storage of claim 15, wherein determining the storage tag comprises associating the first storage location with the second storage location in a data structure indexed by storage locations, in response to determining that the first virtual machine data contents are interchangeable with the second virtual machine data contents.

20. The non-transitory computer storage of claim 19, wherein determining that the first virtual machine data contents are interchangeable with the second virtual machine data contents comprises comparing a hash of the first virtual machine data contents with a hash of the second virtual machine data contents to determine that they are very likely to be identical.

21. The non-transitory computer storage of claim 15, wherein the first storage location and the second storage location are indicated by physical sector addresses.

* * * * *

UNITED STATES PATENT AND TRADEMARK OFFICE
CERTIFICATE OF CORRECTION

PATENT NO.         : 8,938,572 B1                              Page 1 of 1
APPLICATION NO.    : 13/953268
DATED              : January 20, 2015
INVENTOR(S)        : Pradeep Vincent It is certified that error appears in the above-identified patent and that said Letters Patent is hereby corrected as shown below:

In the claims

In column 14 at line 48, Claim 6, change "The method of claim 5" to --The system of claim 5--.

Signed and Sealed this
Ninth Day of February, 2016

Michelle K. Lee
*Director of the United States Patent and Trademark Office*